United States Patent [19]

Gras

[11] Patent Number: 4,649,067
[45] Date of Patent: Mar. 10, 1987

[54] ONE-COMPONENT BAKING ENAMELS

[75] Inventor: Rainer Gras, Bochum, Fed. Rep. of Germany

[73] Assignee: Chemische Werke Huls Aktiengesellschaft, Marl, Fed. Rep. of Germany

[21] Appl. No.: 613,797

[22] Filed: May 24, 1984

[30] Foreign Application Priority Data

Jun. 24, 1983 [DE] Fed. Rep. of Germany ....... 3322722

[51] Int. Cl.$^4$ ...................... B05D 3/02; C08G 18/81; C08K 5/10
[52] U.S. Cl. ............................. 427/388.2; 427/389.7; 427/393.5; 524/315; 524/360; 524/361; 524/602; 524/604; 524/605; 525/437; 525/440; 528/45
[58] Field of Search .................. 525/437, 440; 528/45; 524/602, 604, 605, 315, 360, 361; 427/389.7, 388.2, 393.5

[56] References Cited

U.S. PATENT DOCUMENTS

| | | | |
|---|---|---|---|
| 4,150,211 | 4/1979 | Müller et al. ................... | 525/440 X |
| 4,151,152 | 4/1979 | Schmitt et al. ................... | 528/45 X |
| 4,289,682 | 9/1981 | Peters ............................. | 525/440 X |
| 4,289,813 | 9/1981 | Blomeyer et al. ............... | 525/440 X |
| 4,530,859 | 7/1985 | Grunzinger, Jr. ............... | 427/385.5 |

Primary Examiner—Thurman K. Page

Attorney, Agent, or Firm—Oblon, Fisher, Spivak, McClelland & Maier

[57] ABSTRACT

One-component baking enamels of polyesters, containing hydroxyl groups, and polyisocyanates, wherein the polyisocyanate component consists of 2-methyl-1,5-diisocyanatopentane (MPDI) having the formula (I):

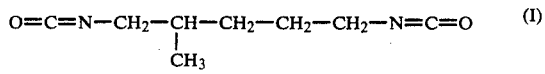

which is blocked totally or partially by ε-caprolactam or acetoxime, or a mixture of the same with 2-ethyl-1,4-diisocyanatobutane (EBDI) having the formula (II):

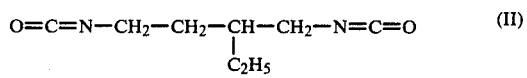

which is blocked totally or partially by ε-caprolactam or acetoxime, wherein the diisocyanate mixture of (I) and (II) has about 88 to 99% by weight of (I) and about 12 to 1% by weight of (II) and the free isocyanate (NCO) content is up to about 10% by weight.

The one-component baking enamels are suitable for application to metal, glass and plastic objects and exhibit excellent flexibility and weather resistance.

16 Claims, No Drawings

ONE-COMPONENT BAKING ENAMELS

BACKGROUND OF THE INVENTION

1. Field of the Invention

This invention relates to polyurethane one-component baking enamels containing solvents and consisting of 2-methyl-1,5-diisocyanatopentane (MPDI) blocked totally or partially with ε-caprolactam or acetoxime or a mixture of MPDI and 2-ethyl-1,4-diisocyanatobutane (EBDI) and also of polyesters containing hydroxyl groups with a base of predominantly aromatic dicarboxylic acids and diols and triols.

2. Description of the Prior Art

For the production of mixtures of polyisocyanates and polyoxy compounds that are stable at the usual temperatures, as is known, polyisocyanates are used whose reactive groups are blocked by reaction with monofunctional compounds and generally are designated as masked or blocked polyisocyanates. Products of this type are described, for example, in Annalen, Volume 562 (1949) pp 205–229.

At higher temperatures, they again break down into their initial components, whereby the isocyanate groups, which are released, in turn can react with the polyoxy compounds that are present in the reaction mixture.

If these mixtures of blocked polyisocyanates and polyoxy compounds are to be applied for coating objects by the spraying or curtain coating process and for coating of sheet metal by roll coating, especially by the coil coating process, both the cross-linking agent and the resin must be soluble in the usual varnish solvents and stable in storage.

With only few exceptions, aliphatic polyisocyanates blocked with ε-caprolactam or acetoxime, are incompatible with the usual varnish solvents. They are, therefore, eliminated as initial components for production of PUR one-component baking enamels preferably for coating metal objects with highly deformable coatings.

Production of hexamethylenediisocyanate (HDI) blocked with ε-caprolactam or acetoxime in conventional varnish solvents is thwarted by incompatibility. These products precipitate during or shortly after the reaction. Even partial blocking of HDI and subsequent reaction with the polyoxy compounds was able to impart to the varnish solutions only a short-lived stability in storage. Another drawback is the limited thermal and oxidation stability, which in practice proves to be markedly troublesome when the conveyor is stopped during hardening; the results are quality losses, e.g., discoloration of the varnish layer.

Therefore, a need clearly continues to exist for aliphatic polyisocyanates which can be blocked with ε-caprolactam or acetoxime to form blocked polyisocyanates which are compatible with conventional varnish solvents and which exhibit in the varnish solutions both thermal and oxidative stability.

SUMMARY OF THE INVENTION

Accordingly, it is an object of the present invention to provide aliphatic polyisocyanates which can be blocked with ε-caprolactam or acetoxime to form blocked polyisocyanates which are compatible with conventional varnish solvents.

It is also an object of this invention to provide aliphatic polyisocyanates which can be blocked with ε-caprolactam or acetoxime to form blocked polyisocyanates which exhibit both thermal and oxidative stability when used in varnish solutions.

Further, it is an object of the present invention to provide one-component baking enamels of the polyesters containing hydroxyl groups and polyisocyanates which have excellent storage stability.

According to the present invention, the foregoing and other objects are attained by providing one-component baking enamels comprising polyesters, containing hydroxyl groups, and polyisocyanates, wherein the polyisocyanate component consists of 2-methyl-1,5-diisocyanatopentane (MPDI) having the formula (I):

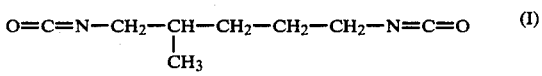

which is blocked totally or partially by ε-caprolactam or acetoxime, or a mixture of the same with 2-ethyl-1,4-diisocyanatobutane (EBDI) having the formula (II):

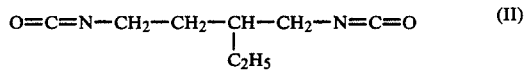

which is blocked totally or partially by ε-caprolactam or acetoxime, wherein the diisocyanate mixture of (I) and (II) has about 88 to 99% by weight of (I) and about 12 to 1% by weight of (II) and the free isocyanate (NCO) content is up to about 10% by weight.

DESCRIPTION OF THE PREFERRED EMBODIMENTS

Surprisingly, it has been found that the aforementioned drawbacks can be avoided, if MPDI or a mixture of MPDI and EBDI, blocked totally or partially with ε-caprolactam or acetoxime, is used as the polyisocyanate component, whereby the diisocyanate mixture has the following composition: about 88 to 99% by weight of 2-methyl-1,5-diisocyanatopentane (MPDI) and about 12 to 1% by weight of 2-ethyl-1,4-diisocyanatobutane and the free isocyanate (NCO) content is about 10% by weight, preferably up to about 5% by weight.

According to the present invention, the above-described polyisocyanate components is used in combination with polyesters containing hydroxyl groups with a base mainly of aromatic dicarboxylic acids, diols and triols, in which preferably the diols neopentyl glycol and/or hydroxypivalic acid neopentyl glycol ester are incorporated as hard segments.

Mixtures of this kind are dissolved in the usual varnish solvents, optionally with admixture of the additives usual in PUR chemistry, applied by the usual processes to the objects to be coated and hardened by het treatment between about 120° and 350° C., preferably between about 140° and 300° C. The mixture ratio of the binder components can vary in a wide range. The best technical coating characteristics are achieved, if the binder mixture consists of about 50 to 90% by weight of the polyester and about 50 to 10% by weight of the cross-linking agent, whereby the OH/NCO ratio can be varied from about 1:0.8 to 1:1.2, preferably about 1:0.95 to 1:1.1. It is particularly recommended to use an equivalent NCO of cross-linking agent per OH equivalent of polyhydroxyl compound.

For production of the cross-linking agent according to the invention, the blocking agent is added in portions to the polyisocyanate (MPDI or MPDI/EBDI mixture) heated to about 80°–120° C. so that the reaction temperature does not exceed 120° or 110° C., respectively. After addition of the blocking agent is completed, heating at 120° to 100° C., respectively, is continued for 1 to 2 hours longer. The reaction is controlled by titrimetric NCO determination.

The blocking can be performed both in substance and, optionally, in an inert organic solvent. It is recommended that suitable, conventional varnish solvents be used for each varnish formulation or application and hardening conditions.

The polyesters containing hydroxyl groups, which are to be used according to the invention, must have a low second order transition temperature; it should be <20° and > −25° C. The essential components of the polyesters are:

1. Cyclic polycarboxylic acids and their esters and anhydrides, e.g., phthalic, isophthalic, terephthalic acid, benzenetricarboxylic acids, trimellitic acid anhydride, dimethyl terephthalate (DMT) and their hydrogenation products.

2. Diols, e.g., ethylene glycol, 1,2-propylene glycol, 1,2- or 1,3- or 1,4-butylene glycol, 3-methyl-1,5-pentanediol, hexamethylene glycol, cyclohexanediol, 4,4'-dihydroxy-2,2-dicyclohexylpropane, 1,4-dihydroxymethylcyclohexane, diethylene glycol, triethylene glycol, preferably, hydroxypivalic acid neopentyl glycol ester or neopentyl glycol.

3. Polyols such as glycerin, hexanetriol, pentaerythritol, trimethylolpropane (TMP), trimethylolethane.

The polyesters can proportionately also contain monofunctional carboxylic acids, e.g., benzoic acid and acyclic polycarboxylic acids, such as adipic acid, 2,2,4-(2,4,4)-trimethyladipic acid, sebacic and dodecanedicarboxylic acid. The polyesters are produced, in a way known in the art, by esterification or transesterification, optionally in the presence of the usual catalysts, whereby, by a suitable selection of COOH/OH ratio, end products are obtained, whose hydroxyl number is between 30 and 300, preferably between 70 and 150 mg KOH/g.

Suitable solvents for the one-component baking enamels according to the invention are those whose lower limit of the boiling point is around 100° C. The upper limit of the boiling point of the solvent depends on the particular baking conditions. If the baking is performed at higher temperatures, the boiling points of the solvents used must also be at higher temperatures. The following solvents, among others, are suitable:

Hydrocarbons such as, e.g., toluene, xylene, Solvesso ® 150 or 200 (mixture of aromatic hydrocarbons of the Esso Co.), Tetralin ®; Esters such as, e.g., butyl acetate, n-hexyl acetate, ethylene glycol acetate (EGA), or butyl glycol acetate; and Ketones, such as, e.g., methyl isobutyl ketone, diisobutyl ketone, isophorone. Said solvents can also be used as mixtures.

The concentration of the resin (polyester)/cross-linking agent (hardening agent) mixture (binder) in the solvents mentioned above is between about 40 and 80% by weight.

The polyurethane one-component baking enamels are produced by mixing with the polyester component when totally blocked cross-linking agents are used, while when partially blocked cross-linking agents are used, the NCO with the OH groups, optionally in combination with the catalysts that are customary in PUR chemistry, must be reacted. The homogenization and optionally the reaction occur between 20° and 100° C. in suitable mixing units. Then the usual additives, such as pigments, fillers, leveling agents, gloss improvers, defoaming agents, wetting agents and stabilizing agents can be added to the varnish solution. These additives are abraded in stirred sand or ball mills.

The one-component baking enamels are suitable for application especially to metal surfaces but also to objects of other materials, such as glass or plastic. The enamels according to the invention have application especially in coil coating for one and two weather-resistant coats.

Hardening of the enamels according to the invention occurs, depending on the specific application, in a temperature range of about 120° to 350° C., preferably between about 140° and 300° C. in a period of 30 minutes to 30 seconds. The enamel film exhibits outstanding technical enamel properties, especially great flexibility and weather resistance.

The present invention will be further illustrated by certain examples and references which are provided for purpose of illustration only and are not intended to limit the present invention.

EXAMPLES

A. Production of totally or partially blocked polyisocyanates.

EXAMPLE 1

68.86 parts by weight of ε-caprolactam were added in portions at 80° C. to 51.14 parts by weight of MPDI dissolved in 80 parts by weight of solvent mixture so that the reaction temperature did not exceed 120° C. After addition of the ε-caprolactam was completed, heating was continued for 2 hours longer at 120° C.

| NCO content (latent) | 12.6% by weight |
| NCO content (free) | <0.3% by weight |

The efflux time in a DIN-4 flow cup at 20° C. of the 60% by weight solution was:

| (a) n-butyl acetate/xylene (tech) | 1:3 | 11 sec |
| (b) EGA/xylene (tech) | 1:2 | 15 sec |
| (c) EGA/Solvesso ® 150 | 1:2 | 21 sec |

Solvesso ® 150 is a mixture of aromatic hydrocarbons (98%) with boiling limits of 177° to 206° C. of the Esso company and has a dew point of at least 66° C.

EXAMPLE 2

64.76 parts by weight of ε-caprolactam were added in portions at 80° C. to 55.24 parts by weight of MPDI dissolved in 80 parts by weight of a solvent mixture so that the reaction temperature did not exceed 120° C. After addition of the ε-caprolactam was completed, heating was continued for 2 hours longer at 120° C.

| NCO content (latent) | 13.6% by weight |
| NCO content (free) | 1.7% by weight |

The efflux time in a DIN-4 flow cup at 20° C. of 60% by weight solution was:

| (a) n-butyl acetate/xylene (tech) | 1:3 | 9 sec |

| | | |
|---|---|---|
| (b) EGA/xylene (tech) | 1:2 | 12 sec |
| (c) EGA/Solvesso ® 150 | 1:2 | 17 sec |

EXAMPLE 3

226.2 parts by weight of ε-caprolactam were added in portions at 80° C. to 168 parts by weight of MPDI-/EBDI mixture in 262.8 parts by weight of solvent mixture so that the reaction temperature did not exceed 120° C. After addition of the ε-caprolactam was completed, heating was continued for 2 hours longer at 120° C.

| | |
|---|---|
| NCO content (latent) | 12.6% by weight |
| NCO content (free) | <0.3% by weight |

The efflux time in a DIN-4 flow cup at 20° C. of the 60% by weight solution was:

| | | |
|---|---|---|
| (a) n-butyl acetate/xylene (tech) | 1:3 | 10 sec |
| (b) EGA/xylene (tech) | 1:2 | 14 sec |
| (c) EGA/Solvesso ® 150 | 1:2 | 18 sec |

EXAMPLE 4

Operation as in Example 3, but with 196.97 parts by weight of ε-caprolactam in 243.33 parts by weight of solvent mixture.

| | |
|---|---|
| NCO content (latent) | 13.6% by weight |
| NCO content (free) | 1.8% by weight |

The efflux time in a DIN-4 flow cup at 20° C. of the 60% by weight solution in

| | | |
|---|---|---|
| (a) n-butyl acetate/xylene (tech) | 1:3 | 8 sec |
| (b) EGA/xylene (tech) | 1:2 | 12 sec |
| (c) EGA/Solvesso ® 150 | 1:2 | 16 sec |

EXAMPLE 5

55.84 parts by weight of acetoxime were added in portions at 80° C. with vigorous stirring to 64.16 parts by weight of MPDI in 80 parts by weight of solvent mixture so that the temperature of the reaction mixture did not exceed 100° C. After the addition of the acetoxime was completed, the reaction mixture was heated for 2 hours longer at 100° C.

| | |
|---|---|
| NCO content (latent) | 15.8% by weight |
| NCO content (free) | <0.3% by weight |

The efflux time in a DIN-4 flow cup at 20° C. of the 60% by weight solution was:

| | | |
|---|---|---|
| (a) n-butyl acetate/xylene (tech) | 1:3 | 10 sec |
| (b) EGA/xylene (tech) | 1:2 | 15 sec |
| (c) EGA/Solvesso ® 150 | 1:2 | 20 se |

EXAMPLE 6

Operation as in Example 5, but with 52.4 parts by weight of acetoxime in 77.71 parts by weight of solvent mixture.

| | |
|---|---|
| NCO content (latent) | 16.8% by weight |
| NCO content (free) | 1.8% by weight |

The efflux time in a DIN-4 flow cup at 20° C. of the 60% by weight solution was:

| | | |
|---|---|---|
| (a) n-butyl acetate/xylene (tech) | 1:3 | 7 sec |
| (b) EGA/xylene (tech) | 1:2 | 11 sec |
| (c) EGA/Solvesso ® 150 | 1:2 | 15 sec |

EXAMPLE 7

146.2 parts by weight of acetoxime were added in portions at 80° C. with vigorous stirring to 168 parts by weight of MPDI/EBDI mixture in 209.5 parts by weight of solvent mixture so that the temperature of the reaction mixture did not exceed 100° C. After addition of the acetoxime was completed, the reaction mixture was heated for 2 hours longer at 100° C.

| | |
|---|---|
| NCO content (latent) | 15.84% by weight |
| NCO content (free) | <0.3% by weight |

The efflux time in a DIN-4 flow cup at 20° C. of the 60% by weight solution was:

| | | |
|---|---|---|
| (a) n-butyl acetate/xylene (tech) | 1:3 | 9 sec |
| (b) EGA/xylene (tech) | 1:2 | 14 sec |
| (c) EGA/Solvesso ® 150 | 1:2 | 20 sec |

EXAMPLE 8

Operation as in Example 7, but with 130.5 parts by weight of acetoxime in 199 parts by weight of solvent mixture.

| | |
|---|---|
| NCO content (latent) | 16.77% by weight |
| NCO content (free) | 1.83% by weight |

The efflux time in a DIN-4 flow cup at 20° C. of the 60% by weight solution was:

| | | |
|---|---|---|
| (a) n-butyl acetate/xylene (tech) | 1:3 | 7 sec |
| (b) EGA/xylene (tech) | 1:2 | 10 sec |
| (c) EGA/Solvesso ® 150 | 1:2 | 16 sec |

EXAMPLES OF COMPARISON WITH HDI

EXAMPLE 9

Operation as in Examples 3 and 4 (caprolactam) or 7 and 8 (acetoxime) but with HDI. The blocked HDI adducts precipitated during or shortly after production, so that no viscosities in the DIN-4 flow cup at 20° C. could be determined.

In the case of partially blocked HDI adducts, the reaction with the polyester was performed with heat (80° to 100° C.) to try to adjust the varnish solutions with better compatibility by the OH/NCO prereaction. The clear varnish solutions and the corresponding pigmented varnish solutions crystallized out overnight; there was thus no storage stability. The varnish solutions could be kept in solution only at 60° to 80° C. so that the determination of the varnish technical characteristics did not occur.

B. Production of the polyesters according to the invention.

EXAMPLE 1

7 mol (1,162 g) of isopthalic acid, 2 mol (268 g) of trimethylolpropane, 4 mol (472 g) of hexamethylene glycol and 2 mol (408 g) of hydroxypivalic acid neopentyl glycol ester were brought to esterification in a 4-liter glass flask. 0.05% by weight of di-n-butyltin oxide was used as the esterification catalyst. The first water separation occurred at about 190° C. The temperature was raised to 220° C. within 6 to 8 hours. The esterification was brought to completion within 6 hours at 220° C. The polyester was then cooled to 200° C. and within 30 to 45 minutes was substantially freed of volatile constituents by setting up a vacuum (15 to 30 torr). A weak N$_2$ current was directed through the reaction mixture during the entire reaction.

Physical characteristics

| Hydroxyl number | 90 to 106 mg KOH/g |
|---|---|
| Acid number | 2 mg KOH/g |

The efflux time determined with a DIN-4 flow cup at 20° C. of the 60% by weight solution was:

| (a) n-butyl acetate/xylene (tech) | 1:3 | 219 sec |
|---|---|---|
| (b) EGA/xylene (tech) | 1:2 | 340 sec |
| (c) EGA/Solvesso ® 150 | 1:2 | 652 sec |

EXAMPLE 2

7 mol (1,162 g) of isophthalic acid, 5 mol (590 g) of hexamethylene glycol, 1 mol (104 g) of neopentyl glycol and 2 mol (268 g) of trimethylolpropane were esterified to an acid number of <2 mg KOH/g as described in Example B 1.

Physical data

| OH number | 100 to 105 mg KOH/g |
|---|---|
| Acid number | <2 mg KOH/g |
| Second order transition temperature (DTA) | +2 to +12° C. |

The efflux time in a DIN-4 flow cup at 20° C. of the 60% by weight solution was:

| (a) n-butyl acetate/xylene (tech) | 1:3 | 597 sec |
|---|---|---|
| (b) EGA/xylene (tech) | 1:2 | 704 sec |
| (c) EGA/Solvesso ® 150 | 1:2 | 1,205 sec |

EXAMPLE 3
(Comparison)

7 mol (1,162 g) of isophthalic acid, 2 mol (268 g) of trimethylolpropane and 6 mol (708 g) of hexamethylene glycol were esterified to an acid number of <2 mg KOH/g as described in Example B 1.

Physical data

| OH number | 100 to 105 mg KOH/g |
|---|---|
| Acid number | <2 mg KOH/g |
| Second order transition temperature (DTA) | +4 to +12° C. |

The efflux time, determined with a DIN-4 flow cup at 20° C. of the 60% by weight solution was:

| (a) n-butyl acetate/xylene (tech) | 1:3 | 525 sec |
|---|---|---|
| (b) EGA/xylene (tech) | 1:2 | 657 sec |
| (c) EGA/Solvesso ® 150 | 1:2 | 1,133 sec |

C. Polyurethane one-component baking enamels.

Both the 60% by weight isocyanate solutions and the 60% by weight polyester solutions were used for the formulations of the pigmented varnish systems.

EXAMPLE 1

45.16% by weight of polyester solution according to B 1 were mixed with 17.34% by weight of blocked isocyanate solution according to A 1 and 7% by weight of solvent and then abraded with 29.4% white pigment (TiO$_2$), 0.1% by weight of leveling agent (silicone oil of Bayer AG), 1% by weight of defoaming agent (Byk-spezial of the Byk-Mallinkrodt company) in a stirred ball mill.

Application was made on 1-mm steel and aluminum sheets and hardening was performed in a circulated air drying box. The hardening temperatures were 150° to 300° C.

The abbreviations used in the following tables are:

| HK hardness according to Koenig (in sec) | (DIN 53 157) |
|---|---|
| HB hardness according to Buchholz | (DIN 53 153) |
| ET Erichsen test (in mm) | (DIN 53 156) |
| CT cross-cut test | (DIN 53 151) |
| GG 20° measurement of gloss according to Gardner and GG 60° | (ASTM-D 523) |
| Imp. rev. Impact reverse (in inch - lb) | |

| Hardening Conditions | Mechanical Characteristics ||||||||
|---|---|---|---|---|---|---|---|---|
| Time min./ Temp. °C. | HK | HB | ET | Imp. rev. | T-Bend-Test | Pencil Hardness | CT | GG 20°⫟ | GG 60°⫟ |
| 1,5/300 | 171 | 125 | >10 | >82 | 0 | H-2H | 0 | 83 | 90 |
| 7/200 | 168 | 111 | >10 | >82 | 0-1 | H | 0 | 84 | 92 |
| 10/200 | 170 | 125 | >10 | >82 | 0 | H-2H | 0 | 82 | 91 |
| 20/180 | 165 | 111 | >10 | >82 | 0-1 | H | 0 | 85 | 90 |

-continued

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 30/170 | 166 | 111 | >10 | >82 | 0-1 | H | 0 | 82 | 92 |

The film thickness of the enamel films amounted to 25 to 30 μm.
The storage stability of the enamel solutions according to the invention was given after 9-months storage both at room temperature and at +5° C.

EXAMPLE 2

Production, application and hardening of the enamel occurred according to C 1.

Formulation:
46.11% by wt polyester solution according to B 1
16.39% by wt solution of cross-linking agent according to A 2
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 1,5/300 | 173 | 125 | >10 | >82 | 0 | H-2H | 0 | 81 | 92 |
| 7/200 | 169 | 111 | >10 | >82 | 0 | H | 0 | 83 | 90 |
| 10/200 | 174 | 125 | >10 | >82 | 0 | H-2H | 0 | 85 | 93 |
| 20/180 | 168 | 111 | >10 | >82 | 0-1 | H | 0 | 84 | 91 |
| 30/170 | 166 | 111 | >10 | >82 | 0 | H | 0 | 83 | 90 |

The film thickness of the enamel films amounted to 25 to 30 μm.

EXAMPLE 3

Production, application and hardening of the enamel occurred according to C 1.

Formulation:
45.16% by wt polyester solution according to B 1
17.34% by wt solution of cross-linking agent according to A 3
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 1,5/300 | 174 | 125 | >10 | >82 | 0 | H-2H | 0 | 85 | 92 |
| 7/200 | 168 | 111 | >10 | >82 | 0 | H | 0 | 81 | 89 |
| 10/200 | 172 | 125 | >10 | >82 | 0 | H-2H | 0 | 84 | 93 |
| 20/180 | 170 | 111 | >10 | >82 | 0-1 | H-2H | 0 | 83 | 91 |
| 30/170 | 166 | 111 | >10 | >82 | 0-1 | H | 0 | 83 | 90 |

The film thickness of the enamel films amounted to 25 to 30 μm.

EXAMPLE 4

Production, application and hardening of the enamel occurred according to C 1.

Formulation:
46.16% by wt polyester solution according to B 1
16.39% by wt solution of cross-linking agent according to A 4
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 1,5/300 | 170 | 111 | >10 | >82 | 0-1 | H | 0 | 81 | 92 |
| 7/200 | 172 | 125 | >10 | >82 | 0 | H-2H | 0 | 84 | 94 |
| 10/200 | 175 | 125 | >10 | >82 | 0 | H-2H | 0 | 83 | 91 |
| 20/180 | 168 | 125 | >10 | >82 | 0-1 | H | 0 | 80 | 93 |
| 30/170 | 169 | 111 | >10 | >82 | 0-1 | H | 0 | 82 | 91 |

The film thickness of the enamel films amounted to 25 to 30 μm.

EXAMPLE 5

Production, application and hardening of the enamel occurred according to C 1.

Formulation:
48.51% by wt polyester solution according to B 1

13.94% by wt solution of cross-linking agent according to A 6
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions | Mechanical Characteristics | | | | | | | | |
|---|---|---|---|---|---|---|---|---|---|
| Time min./ Temp. °C. | HK | HB | ET | Imp. rev. | T-Bend-Test | Pencil Hardness | CT | GG 20° | GG 60° |
| 7/200 | 170 | 111 | >10 | >82 | 0 | H-2H | 0 | 82 | 91 |
| 10/180 | 169 | 111 | >10 | >82 | 0 | H | 0 | 84 | 91 |
| 14/170 | 168 | 111 | >10 | >82 | 0 | H | 0 | 81 | 90 |
| 18/160 | 167 | 100 | >10 | >82 | 0 | H | 0 | 80 | 90 |
| 23/150 | 166 | 100 | >10 | >82 | 0-1 | H | 0 | 83 | 91 |

The film thickness of the enamel films amounted to 25 to 30 μm.

EXAMPLE 6

Production, application and hardening of the enamel occurred according to C 1.
Formulation:
48.51% by wt polyester solution according to B 1
13.94% by wt solution of cross-linking agent according to A 8
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions | Mechanical Characteristics | | | | | | | | |
|---|---|---|---|---|---|---|---|---|---|
| Time min./ Temp. °C. | HK | HB | ET | Imp. rev. | T-Bend-Test | Pencil Hardness | CT | GG 20° | GG 60° |
| 7/200 | 169 | 111 | >10 | >82 | 0 | H | 0 | 81 | 91 |
| 10/180 | 170 | 111 | >10 | >82 | 0 | H-2H | 0 | 82 | 91 |
| 14/170 | 168 | 111 | >10 | >82 | 0 | H | 0 | 82 | 91 |
| 18/160 | 166 | 100 | >10 | >82 | 0 | H | 0 | 83 | 91 |
| 23/150 | 165 | 100 | >10 | >82 | 0-1 | H | 0 | 82 | 91 |

The film thickness of the enamel films amounted to 25 to 30 μm.

EXAMPLE 7

Production, application and hardening of the enamel occurred according to C 1.
Formulation:
46.99% by wt polyester solution according to B 2
15.51% by wt solution of cross-linking agent according to A 4
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions | Mechanical Characteristics | | | | | | | | |
|---|---|---|---|---|---|---|---|---|---|
| Time min./ Temp. °C. | HK | HB | ET | Imp. rev. | T-Bend-Test | Pencil Hardness | CT | GG 20° | GG 60° |
| 1,5/300 | 165 | 100 | >10 | >82 | 0 | H | 0 | 80 | 90 |
| 7/200 | 164 | 100 | >10 | >82 | 0 | H | 0 | 81 | 90 |
| 10/200 | 167 | 111 | >10 | >82 | 0 | H | 0 | 80 | 91 |
| 20/180 | 163 | 100 | >10 | >82 | 0 | F-H | 0 | 83 | 90 |
| 30/170 | 163 | 100 | >10 | >82 | 0 | F-H | 0 | 81 | 91 |

The film thickness of the enamel films amounted to 25 to 30 μm.

EXAMPLE 8

Production, application and hardening of the enamel occurred according to C 1.
Formulation:
49.24% by wt polyester solution according to B 2
13.26% by wt solution of cross-linking agent according to A 8
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions | Mechanical Characteristics | | | | | | | | |
|---|---|---|---|---|---|---|---|---|---|
| Time min./ Temp. °C. | HK | HB | ET | Imp. rev. | T-Bend-Test | Pencil Hardness | CT | GG 20° | GG 60° |
| 7/200 | 164 | 100 | >10 | >82 | 0 | H | 0 | 78 | 91 |
| 10/180 | 163 | 100 | >10 | >82 | 0 | H | 0 | 79 | 93 |
| 14/170 | 161 | 100 | >10 | >82 | 0 | F-H | 0 | 81 | 90 |
| 18/160 | 163 | 100 | >10 | >82 | 0 | H | 0 | 80 | 92 |

-continued

| Hardening Conditions Time min./Temp. °C. | HK | HB | ET | Imp. rev. | T-Bend-Test | Pencil Hardness | CT | GG 20° | GG 60° |
|---|---|---|---|---|---|---|---|---|---|
| 23/150 | 162 | 100 | >10 | >82 | 0 | F-H | 0 | 80 | 92 |

The film thickness of the enamel films amounted to 25 to 30 μm.

EXAMPLE 9

Production, application and hardening of the enamel occurred according to C 1.

Formulation:
46.06% by wt polyester solution according to B 2
16.44% by wt solution of cross-linking agent according to A 3
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions Time min./Temp. °C. | HK | HB | ET | Imp. rev. | T-Bend-Test | Pencil Hardness | CT | GG 20° | GG 60° |
|---|---|---|---|---|---|---|---|---|---|
| 1,5/300 | 164 | 100 | >10 | >82 | 0 | F-H | 0 | 81 | 93 |
| 7/200 | 162 | 100 | >10 | >82 | 0-1 | F-H | 0 | 78 | 90 |
| 10/200 | 165 | 111 | >10 | >82 | 0 | H | 0 | 82 | 91 |
| 20/180 | 163 | 100 | >10 | >82 | 0 | H | 0 | 79 | 90 |
| 30/170 | 162 | 100 | >10 | >82 | 0-1 | F-H | 0 | 81 | 91 |

The film thickness of the enamel films amounted to 25 to 30 μm.

EXAMPLE 10

Production, application and hardening of the enamel occurred according to C 1.

Formulation:
48.69% by wt polyester solution according to B 2
13.8% by wt solution of cross-linking agent according to A 7
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions Time min./Temp. °C. | HK | HB | ET | Imp. rev. | T-Bend-Test | Pencil Hardness | CT | GG 20° | GG 60° |
|---|---|---|---|---|---|---|---|---|---|
| 7/200 | 165 | 111 | >10 | >82 | 0 | H | 0 | 79 | 90 |
| 10/180 | 164 | 100 | >10 | >82 | 0 | H | 0 | 81 | 94 |
| 14/170 | 162 | 100 | >10 | >82 | 0 | F-H | 0 | 78 | 89 |
| 18/160 | 162 | 100 | >10 | >82 | 0 | F-H | 0 | 80 | 92 |
| 23/150 | 160 | 100 | >10 | >82 | 0-1 | F-H | 0 | 80 | 91 |

The film thickness of the enamel films amounted to 25 to 30 μm.

EXAMPLE 11

Comparison

Production, application and hardening of the enamel occurred according to C 1.

Formulation:
46.99% by wt polyester solution according to B 3
15.51% by wt solution of cross-linking agent according to A 4
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions Time min./Temp. °C. | HK | HB | ET | Imp. rev. | T-Bend-Test | Pencil Hardness | CT | GG 20° | GG 60° |
|---|---|---|---|---|---|---|---|---|---|
| 1,5/300 | 125 | 91 | >10 | >82 | 0 | F | 0 | 77 | 90 |
| 7/200 | 120 | 91 | >10 | >82 | 0 | F | 0 | 79 | 91 |
| 10/200 | 124 | 91 | >10 | >82 | 0 | F | 0 | 79 | 93 |
| 20/180 | 118 | 83 | >10 | >82 | 0 | HB | 0 | 76 | 89 |
| 30/170 | 115 | 83 | >10 | >82 | 0 | HB | 0 | 75 | 89 |

The film thickness of the enamel films amounted to 25 to 30 μm.

EXAMPLE 12

Comparison

Production, application and hardening of the enamel occurred according to C 1.

Formulation:
49.29% by wt polyester solution according to B 3

13.21% by wt solution of cross-linking agent according to A 8
7.0% by wt solution mixture according to varnish solution used
29.4% by wt white pigment (TiO2)
1.0% by wt defoaming agent (Byk-spezial)
0.1% by wt leveling agent (silicone oil OL)

| Hardening Conditions | Mechanical Characteristics | | | | | | | | |
|---|---|---|---|---|---|---|---|---|---|
| Time min./ Temp. °C. | HK | HB | ET | Imp. rev. | T-Bend- Test | Pencil Hardness | CT | GG 20°) | GG 60°) |
| 7/200 | 120 | 100 | >10 | >82 | 0 | F | 0 | 80 | 95 |
| 10/180 | 122 | 100 | >10 | >82 | 0 | F | 0 | 77 | 93 |
| 14/170 | 118 | 91 | >10 | >82 | 0 | HB–F | 0 | 81 | 94 |
| 18/160 | 116 | 91 | >10 | >82 | 0 | HB | 0 | 79 | 90 |
| 23/150 | 112 | 83 | >10 | >82 | 0 | HB | 0 | 76 | 94 |

The film thickness of the enamel films amounted to 25 to 30 μm.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. One-component baking enamels comprising polyesters, containing hydroxyl groups, and polyisocyanates, wherein the polyisocyanate component consists of 2-methyl-1,5-diisocyanatopentane (MPDI) having the formula (I):

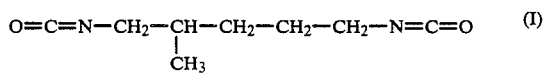

which is blocked totally or partially by ε-caprolactam or acetoxime, or a mixture of the same with 2-ethyl-1,4-diisocyanatobutane (EBDI) having the formula (II):

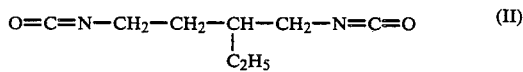

which is blocked totally or partially by ε-caprolactam or acetoxime, wherein the diisocyanate mixture of (I) and (II) has about 88 to 99% by weight of (I) and about 12 to 1% by weight of (II) and the free isocyanate (NCO) content is up to about 10% by weight; and a solvent having a lower limit of the boiling point of around 100° C.

2. The one-component baking enamels of claim 1, wherein said diisocyanate mixture has a free isocyanate (NCO) content of up to about 5% by weight.

3. The one-component baking enamels of claim 1, wherein the mixture consists of about 50 to 90% by weight of the polyester containing hydroxyl groups and about 50 to 10% by weight of a totally or partially blocked MPDI or MPDI and EBDI mixture.

4. The one-component baking enamels of claim 3, wherein the hydroxyl (OH)/isocyanate (NCO) ratio is in the range of 1:0.8 to 1:1.2, respectively.

5. The one-component baking enamels of claim 4, wherein the hydroxy (OH)/isocyanate (NCO) ratio is in the range of 1:0.95 to 1:1.1, respectively.

6. The one-component baking enamels of claim 1, wherein said polyesters containing hydroxyl groups comprise diols, polyols and aromatic dicarboxylic acids and the esters and anhydrides thereof.

7. The one-component baking enamels of claim 6, wherein said polyesters containing hydroxyl groups have a low second order transition temperature which is less than 20° C. and greater than −25° C.

8. The one-component baking enamels of claim 6, wherein said aromatic dicarboxylic acids, esters and anhydrides thereof comprises phthalic, isophthalic, terephthalic and benzene-tricarboxylic acids, trimellitic acid anhydride and dimethyl terephthalate.

9. The one-component baking enamels of claim 6, wherein said diols comprise ethylene glycol, 1,2-propylene glycol, 1,2- or 1,3- or 1,4-butylene glycol, 3-methyl-1,5-pentanediol, hexamethylene glycol, cyclohexanediol, 4,4'-dihydroxy-2,2-dicyclohexylpropane, 1,4-dihydroxymethylcyclohexane, diethylene glycol, triethylene glycol, hydroxypivalic acid neopentyl glycol ester or neopentyl glycol.

10. The one-component baking enamels claim 6, wherein said polyols comprise glycerin, hexanetriol, pentaerythritol, trimethylolpropane and trimethylolethane.

11. The one-component baking enamels of claim 6, wherein said polyesters further comprise the monofunctional carboxylic acid benzoic acid, and the polycarboxylic acids adipic acid, 2,2,4- and 2,4,4-trimethyladipic acid, sebacic acid and dodecanedicarboxylic acid.

12. The one-component baking enamels of claim 1, wherein said solvent is a hydrocarbon selected from the group of toluene or xylene, an ester selected from the group of butyl acetate, n-hexyl acetate, ethylene glycol acetate or butyl glycol acetate, and a ketone selected from the group of methyl isobutyl ketone, diisobutyl ketone or isophorone or a mixture thereof.

13. The one-component baking enamels of claim 1, wherein the concentration of the polyester and the polyisocyanate in the solvent is between about 40 and 80% by weight.

14. The one-component baking enamels of claim 1 which further comprise pigments, fillers, leveling agents, gloss improvers, defoaming agents, wetting agents and stabiliting agents.

15. A method of imparting weather resistance to a metal, glass or plastic object which comprises applying the one-component baking enamel of claim 1 to the surface of said object, and heating said coated object to a temperature in the range of 120° to 350° C. for a period of 30 minutes to 30 seconds, thereby hardening said enamel.

16. The method of claim 15, wherein said coated object is heated to a temperature in the range of 140° to 300° C. for a period of 30 munites to 30 seconds.

* * * * *